United States Patent

Nakasugi et al.

[11] Patent Number: 6,145,377
[45] Date of Patent: Nov. 14, 2000

[54] BALANCE CORRECTOR FOR SCANNER MOTORS AND BALANCE CORRECTING METHOD THEREOF

[75] Inventors: Mikio Nakasugi, Tama; Taku Fukita, Tokyo; Isshin Sato, Yokohama, all of Japan

[73] Assignee: Canon Kabushiki Kaisha, Tokyo, Japan

[21] Appl. No.: 08/575,886

[22] Filed: Dec. 20, 1995

[30] Foreign Application Priority Data

Dec. 27, 1994 [JP] Japan .................................. 6-338255
Aug. 24, 1995 [JP] Japan .................................. 7-239219

[51] Int. Cl.[7] .................................................. G01M 1/00
[52] U.S. Cl. .......................................................... 73/483
[58] Field of Search .............................. 73/483, 460, 66

[56] References Cited

U.S. PATENT DOCUMENTS

| | | | |
|---|---|---|---|
| 4,060,003 | 11/1977 | Bacsanyi et al. | 73/483 |
| 5,373,391 | 12/1994 | Isobe et al. | 359/216 |
| 5,510,664 | 4/1996 | Suzuki et al. | 310/268 |
| 5,532,729 | 7/1996 | Nakasugi | 347/257 |

FOREIGN PATENT DOCUMENTS 0606887  7/1994  European Pat. Off. .

OTHER PUBLICATIONS

Ptent Abstracts of Japan, vol. 013, No. 533, published on Nov. 28, 1989, English Abstract of Japan. Pat. No. 1–219, 532.

Primary Examiner—Christine K. Oda
Attorney, Agent, or Firm—Fitzpatrick, Cella, Harper & Scinto

[57] ABSTRACT

The present invention is directed to a balance correcting method for scanning optical apparatus for deflection-scanning a light beam in such an arrangement that a drive motor is of an inner rotor type in which a rotary body having a drive magnet is disposed inside a stator and a rotary polygon mirror is mounted on the rotary body so as to enable deflection scanning of the light beam, wherein a mechanical part having the rotary body is arranged as separable from an electric circuit part having the stator, the mechanical part having the rotary body is separated from the electric circuit part upon balance correction, only the mechanical part is then mounted on a balance corrector, the mechanical part is rotated by a stator as a rotating device preliminarily provided in the balance corrector, and an amount of unbalance is measured and adjusted.

8 Claims, 8 Drawing Sheets

BALANCE CORRECTOR FOR SCANNER MOTORS AND BALANCE CORRECTING METHOD THEREOF

BACKGROUND OF THE INVENTION

1. Field of the Invention

The present invention relates to a balance corrector for scanner motors of an inner rotor type used in scanning optical apparatus provided with a rotary polygon mirror for scanning a light beam on a photosensitive member, and a balance correcting method thereof.

2. Related Background Art

Recently, the scanner motors used in the scanning optical apparatus are demanded to be rotated at high speed or at high accuracy, and particularly in the case of laser beam printers etc., balance correction (balancing) for a rotary member is indispensable in order to attain high-accuracy deflection scanning apparatus. In order to decrease a windage loss or the like to achieve high-speed rotation, an inner rotor type scanner motor with small inertia or the like is frequently used rather than an outer rotor type scanner motor.

A conventional scanner motor of the inner rotor type is shown in FIG. 11. In FIG. 11, a rotary sleeve 22 is rotatably fit around a stationary shaft 21, and these members are made of ceramics. A stationary member 23 made of a metal material is mounted on the outer periphery of the rotary sleeve 22 by shrinkage fitting or the like. A rotary polygon mirror 24 is fixed to the stationary member 23 by a plate spring 25, and a drive magnet 26 is fixed to the stationary member 23 by adhesion or the like. The stationary shaft 21 is fixed in a motor housing 27, and a motor board 29 to which a stator 28 and electric components etc. are mounted is located as opposed to the drive magnet 26, in the motor housing 27, thus constituting a drive motor.

Further, a permanent magnet 30 is placed on the bottom of the rotary sleeve 22, while a permanent magnet 31 is placed on the stationary shaft 21 so as to be vertically opposed to the permanent magnet 30. These permanent magnets 30, 31 support a load in the thrust direction by mutual repulsion. Here, when the drive motor rotates the rotary sleeve 22, an air film is formed between the stationary shaft 21 and the rotary sleeve 22, whereby the rotary sleeve 22 and the rotary polygon mirror 24 can hydrodynamically be rotated in a non-contact manner.

Balance correction is normally carried out as follows. First, an amount of unbalance is measured as rotating the rotary body including the rotary sleeve 22. Then the rotary body including the rotary sleeve is pulled away from the rotary shaft 21. A first balancing step is to deposit a predetermined amount of balancing weight on the top surface of the rotary polygon mirror 24 through a dispenser 156, as shown in FIG. 12A, and then to irradiate the balancing weight with ultraviolet light from an ultraviolet emitter 158 thereby to fix the balancing weight. A next step is to reverse the rotary body, as shown in FIG. 12B, and to fixedly deposit another balancing weight on the bottom surface of the drive magnet 26 in the same manner. After that, the rotary body is again brought into fit on the stationary shaft 21. Then the rotary body is again rotated to measure an amount of unbalance after the first balancing. The above steps are repeated to achieve high-accuracy balancing.

The above conventional example, however, had the following problems. Since the drive magnet is surrounded by the stator coil because of the structure of the inner rotor motor, a hydrodynamic bearing includes the following problems in carrying out balancing of motor on the two surfaces, i.e. on the rotary polygon mirror 24 and on the drive magnet 26: it requires mounting and dismounting of the rotary body relative to the stationary shaft for every balancing, which increases a probability of damaging the bearing part and which requires cleaning of the bearing part every balancing, thus increasing work procedures and lowering productivity.

When a ball bearing or the like, which is not a hydrodynamic bearing, is employed, the rotary body cannot be dismounted alone, thus requiring correction of balance by another method such as belt drive only with the rotary body before assembling. Since balancing cannot be performed by self drive, enhancement of the balancing accuracy cannot be expected.

SUMMARY OF THE INVENTION

An object of the present invention is to solve the above problems, thus providing a balance correcting method of scanner motor which permits easy two-plane correction of balance in the scanner motor of the inner rotor type.

Another object of the present invention is to provide a balance corrector for scanner motor of the inner rotor type.

The other objects of the present invention will become apparent in the description of specific embodiments to follow.

DESCRIPTION OF THE PREFERRED EMBODIMENTS

Embodiments of the present invention will be explained by reference to the drawings.

Figure 1:
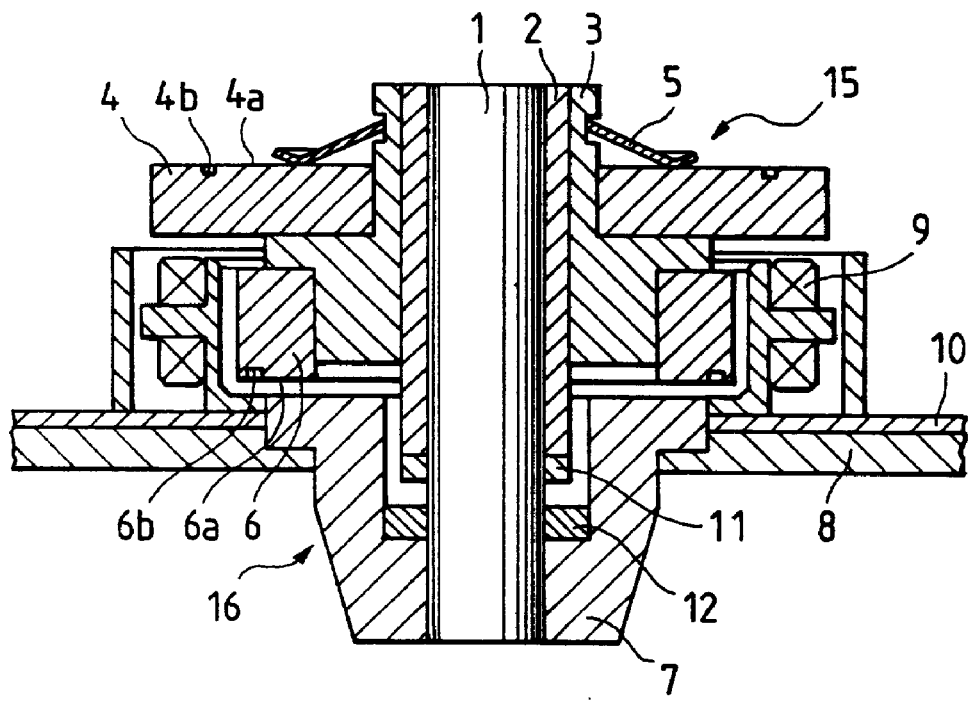
FIG. 1 is a sectional view of a scanner motor of the inner rotor type according to the present invention.

FIG. 1 shows a scanner motor of the inner rotor type according to the present invention, which is composed of two parts, a rotary part 15 and a stationary part 16. In FIG. 1, the rotary part 15 is arranged so that the rotary sleeve 2 is rotatably fit around the stationary shaft 1 and these members are made of ceramics. The stationary member 3 made of a metal material is mounted on the outer periphery of the rotary sleeve 2 by shrinkage fitting or the like, and the rotary polygon mirror 4 is fixed to the stationary member 3 by a plate spring 5. Further, the drive magnet 6 is fixed to the stationary member 3 by adhesion or the like. Here, a circumferential groove 4b is formed on the top surface 4a of the rotary polygon mirror, while a circumferential groove 6b on the bottom surface 6a of the drive magnet 6. Balancing of the rotary body can be effected by putting balance weights not shown on these grooves 4b, 6b. The stationary shaft 1 is fixed in the bottom part of a cup-shaped motor housing 7. Further, the permanent magnet 11 is placed on the bottom of the rotary sleeve 2, while the permanent magnet 12 is placed on the stationary shaft 1 or the motor housing 7 so as to be vertically opposed to the permanent magnet 11. These permanent magnets 11, 12 support a load in the thrust direction by mutual repulsion. The bearing portion in the present embodiment is a hydrodynamic, cylindrical bearing having no grooves on the stationary shaft 1, but it may be replaced by a hydrodynamic bearing with vertical grooves or herringbone grooves on the stationary shaft.

The motor board 10 to which the stator 9 and electric parts etc. are mounted is placed on a base 8 so as to be opposed to the drive magnet 6, and these compose the stationary part 16 of the drive motor. The motor housing 7 is arranged as capable of being incorporated onto the base 8 from above it. Thus, the motor housing 7 is fixed to the base 8 by screws or the like, thereby coupling the rotary part 15 with the stationary part 16.

Figure 2:
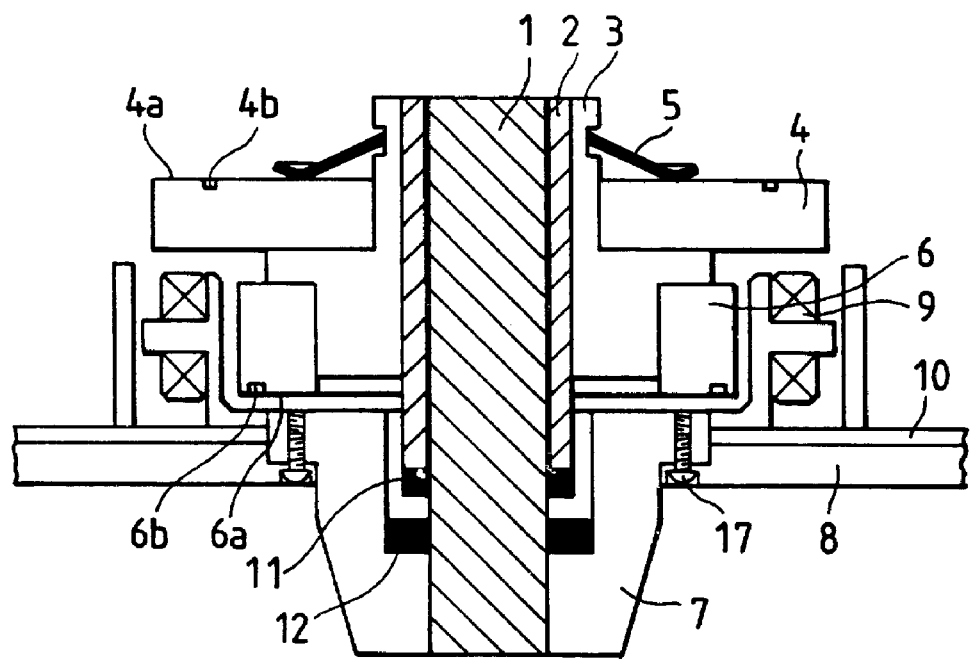
FIG. 2 is a sectional view to show a coupling relation between a rotary part and a stationary part of the scanner motor shown in FIG. 1.

FIG. 2 shows the screws 17 for fixing the motor housing 7 to the base 8.

Figure 3:
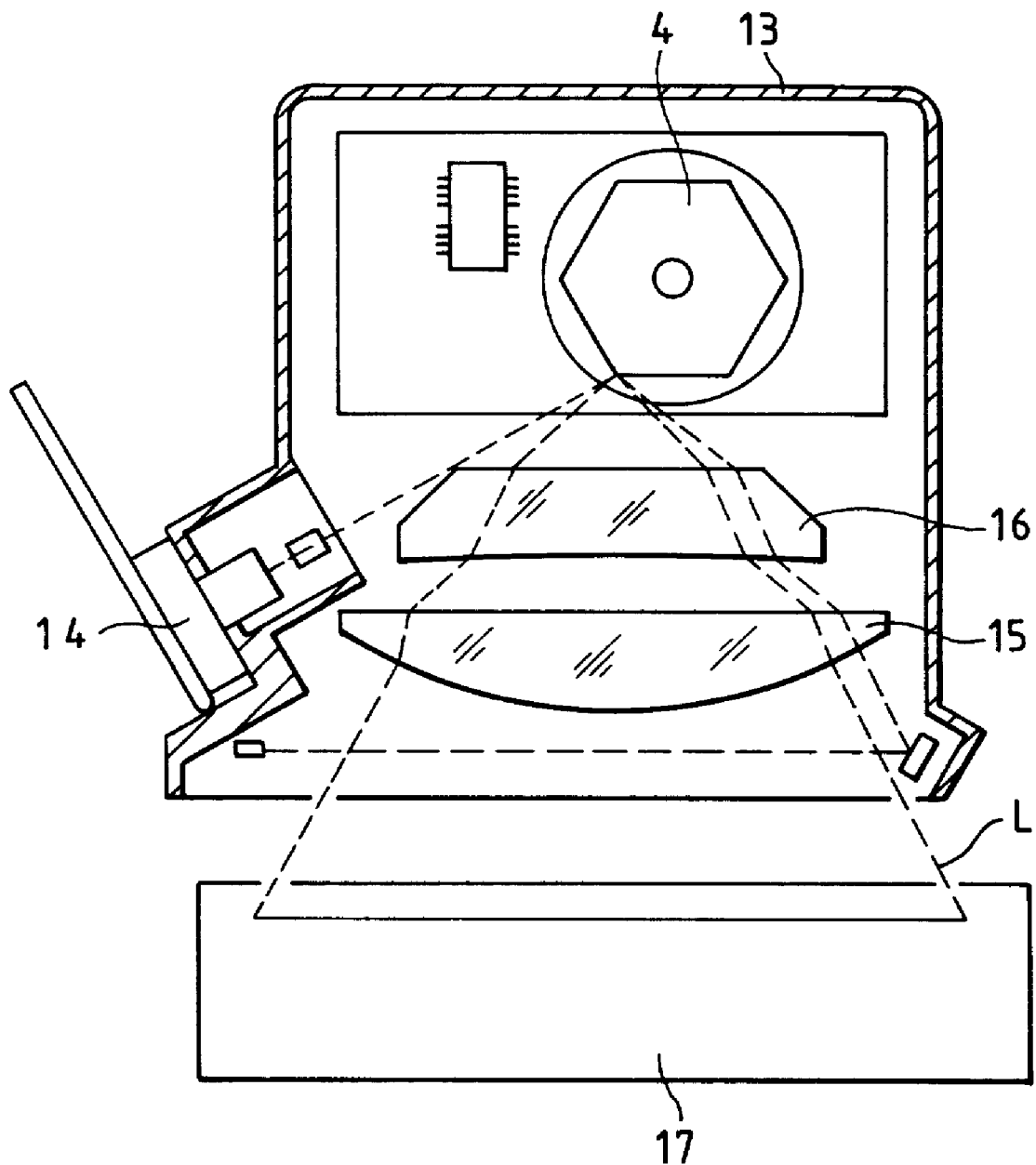
FIG. 3 is a plan view of a scanning optical apparatus using the scanner motor shown in FIG. 1 and FIG. 2.

Here, when the drive motor rotates the rotary sleeve 2, an air film is formed between the stationary shaft 1 and the rotary sleeve 2, whereby the rotary body consisting of the rotary sleeve 2 and the rotary polygon mirror 4, etc. can be rotated through the non-contact bearing. Then the scanner motor of this structure is installed in a scanning optical apparatus, as shown in FIG. 3, wherein a laser beam emitted from a laser unit 14 disposed in an optical box 13 is focused through lenses 15, 16 on a photosensitive member 17 to deflection-scan the photosensitive member 17.

Figure 4:
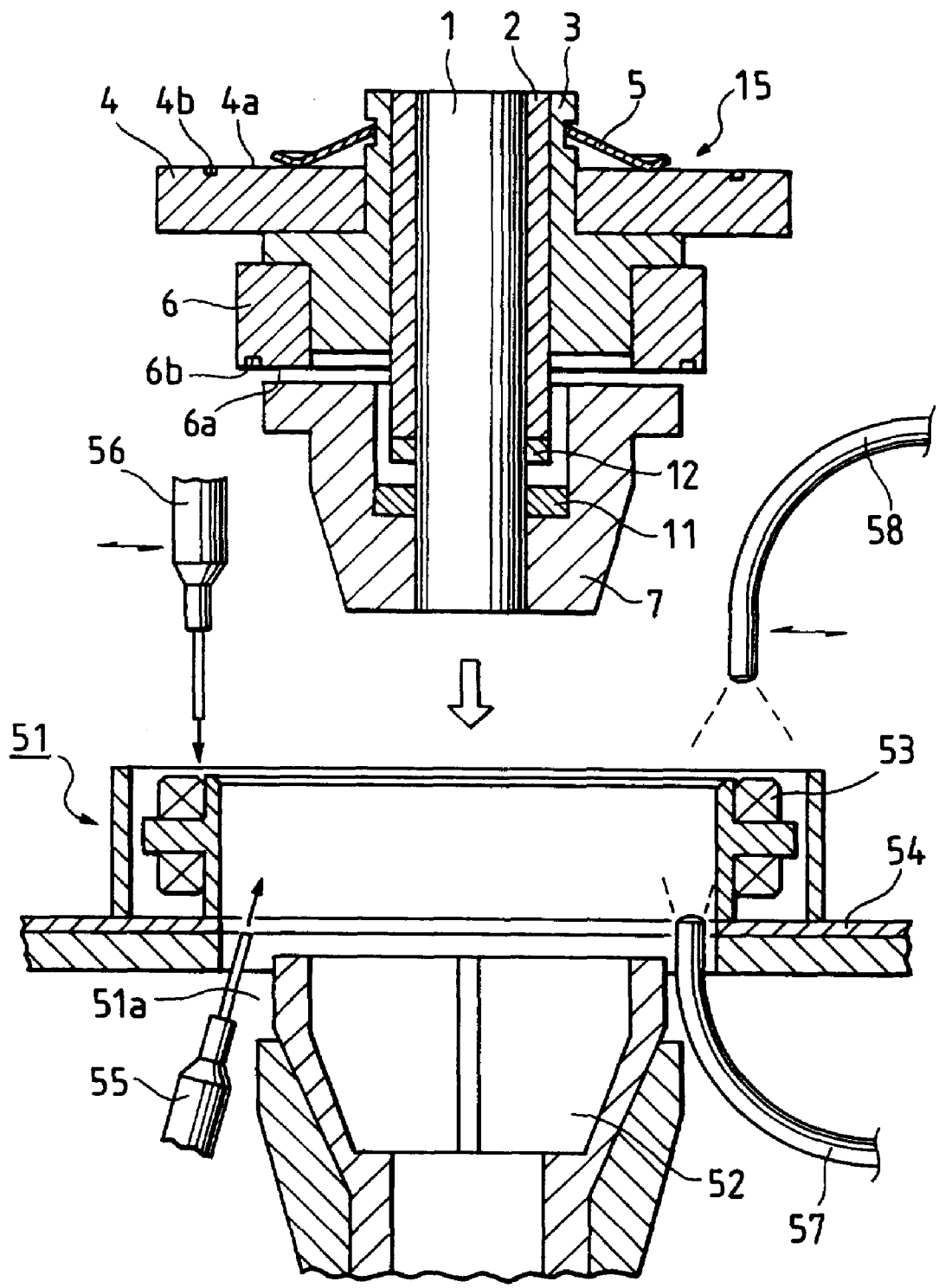
FIG. 4 is a drawing to illustrate a method for setting the rotary part of the scanner motor shown in FIG. 1 and FIG. 2 in a balance corrector, according to the first embodiment of the present invention.
Figure 6:
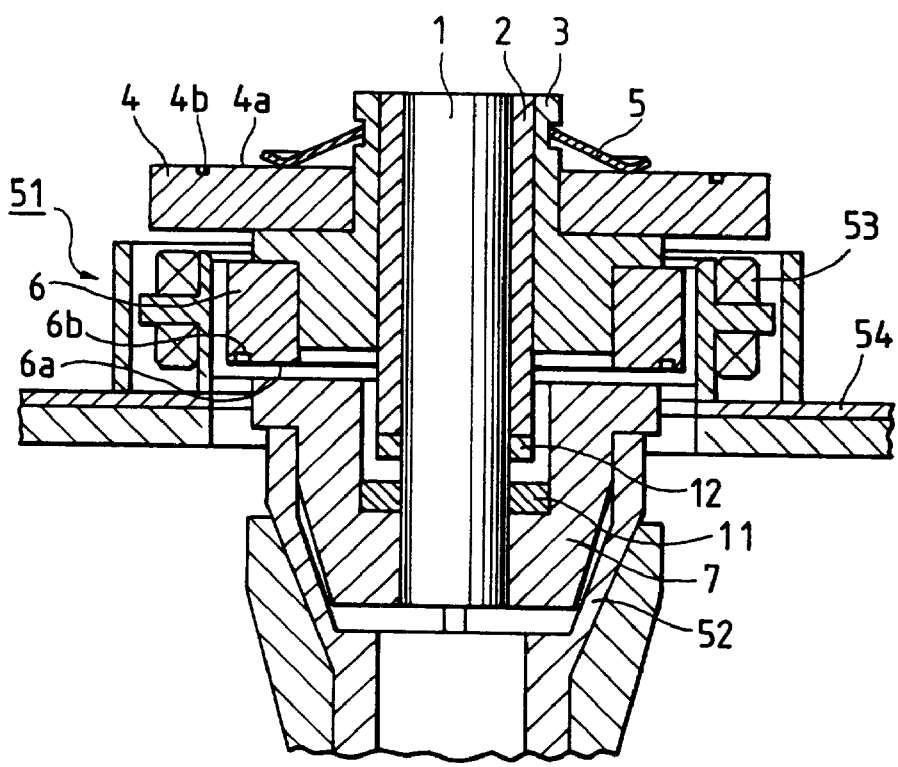
FIG. 6 is a drawing to show a state in which the rotary part of the scanner motor shown in FIG. 4 is set in the balance corrector.

The above arrangement permits the connecting portion between the base 8 and the motor housing 7 to be separated, whereby the deflection scanning apparatus can be separated into the rotary part 15 and the stationary part 16. Here, the rotary part 15 thus separated is set on a fixing jig 52 in a balance corrector 51 from the above thereof, as shown in FIG. 4. The balance corrector 51 has a motor board 54 to which a stator 53 and electric parts, etc. are mounted, which is a mechanical part having the same function as the stationary part 16. Thus, the rotary part 15 is rotated in the balance corrector 51, and unbalance is measured thereby. A clearance 51a is provided between the fixing jig 52 and the mechanical part including the stator 53 etc. so that a device such as a dispenser 55 or a light emitter 57 may be located therein. FIG. 6 is a drawing to show a state in which the rotary part 15 is set on the balance corrector 51.

Figure 7:
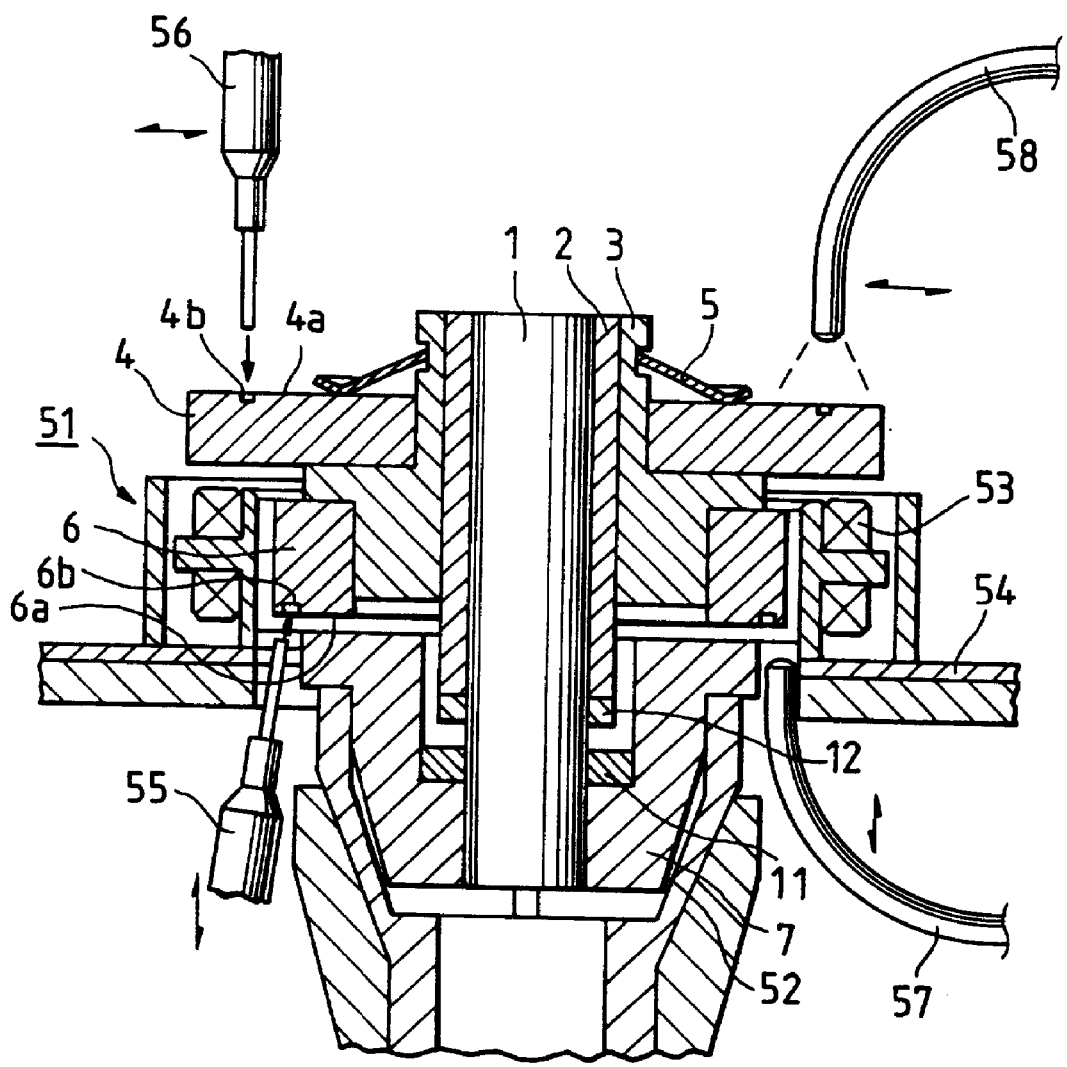
FIG. 7 is a drawing to show a state in which the rotary part of the scanner motor set as shown in FIG. 6 is corrected by the balance corrector.
Figure 8:
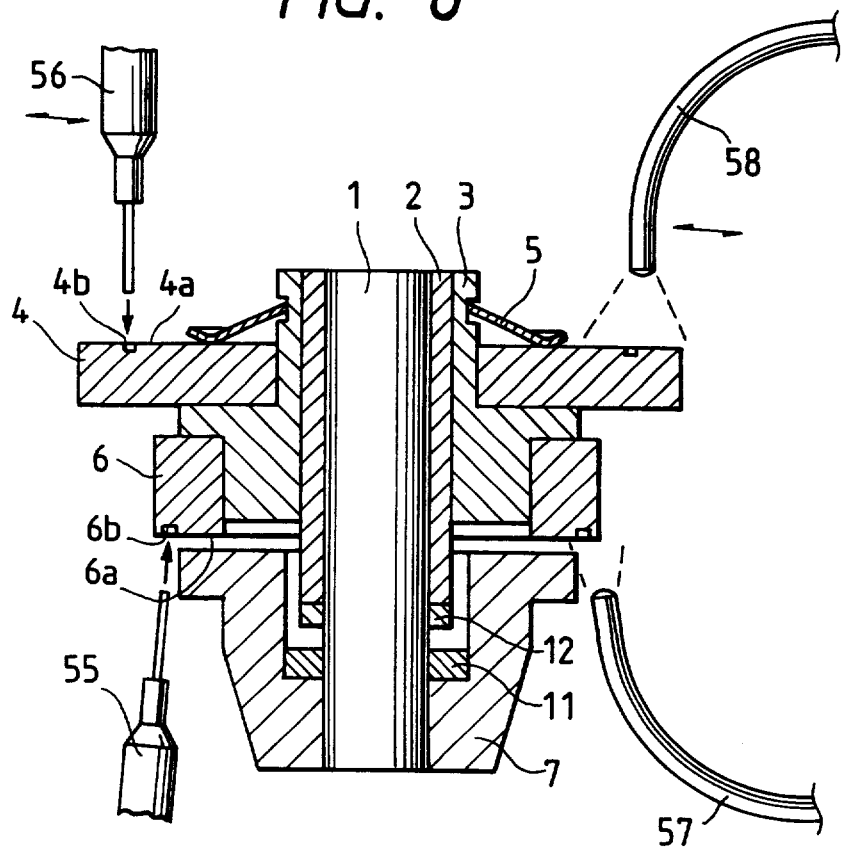
FIG. 8 is a drawing to show a case in which balancing is carried out after the rotary part of the scanner motor is taken out of the balance corrector shown in FIG. 7.

FIG. 7 is a drawing to show a state in which balancing is actually being carried out by the balance corrector 51, wherein dispensers 55, 56 and ultraviolet emitters 57, 58 are set. Here, a balancing weight (for example, an ultraviolet-curing adhesive) is dispensed through the dispenser 55, 56 onto the correction groove 4b, 6b in accordance with an amount of unbalance measured, and the weights thus dispensed are cured under irradiation of ultraviolet light from the ultraviolet emitters 57, 58. Repeating these steps, unbalance can be controlled below a predetermined level of unbalance, thereby ending the balancing operation. The above balancing permits correction of balance without removing the rotary sleeve 2 away from the stationary shaft 1, which facilitates the operation and which prevents the bearing portion from being damaged. As in an example shown in FIG. 8, balancing may be carried out after the mechanical part having the rotary body is removed away from the balance corrector 51.

Figure 5A:
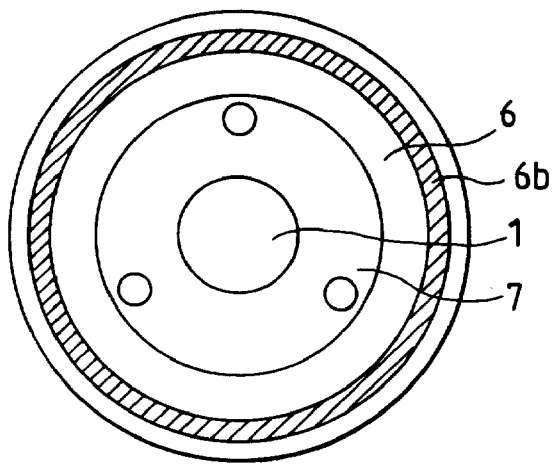
FIG. 5A is a bottom view of the rotary part of the scanner motor shown in FIG. 4.
Figure 5B:
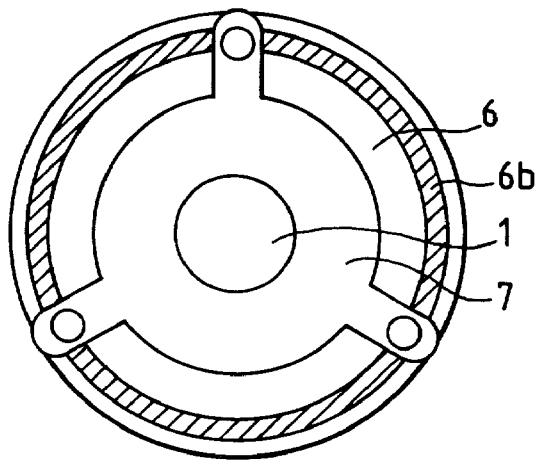
FIG. 5B is a drawing to show a modification of the configuration of the motor housing in the rotary part of the scanner motor shown in FIG. 5A.

It is necessary herein that the whole or a part of the circumferential groove 6b be exposed from the motor housing 7 in order to correct balance by putting a balance weight on the circumferential groove 6b in the bottom surface 6a of the drive magnet 6. Therefore, in the positional relation between the motor housing 7 and the rotor 6 in the bottom view shown in FIG. 5A or FIG. 5B, that is, when they are looked from the bottom, the outer diameter of the motor housing 7 or a part thereof is determined to be smaller than the diameter of the circumferential groove 6b of the rotor 6.

The balancing according to the above method can obviate a need to mount and dismount the rotary body every balancing, which can lower the probability of damaging the bearing and which can improve operability, even in the use of non-contact and hydrodynamic bearing.

Figure 9:
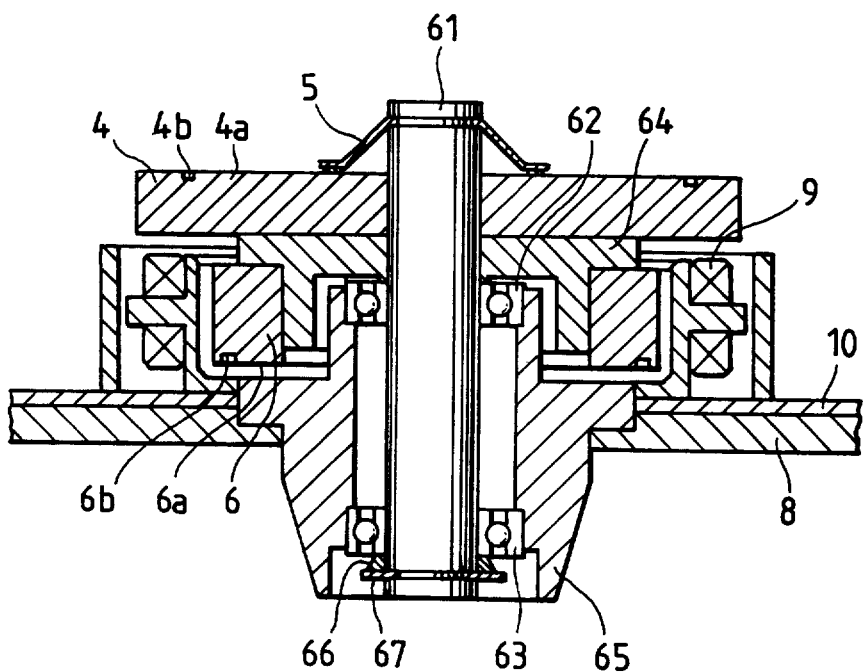
FIG. 9 is a sectional view of a scanner motor having the bearing part consisting of ball bearings, which are not non-contact bearings, instead of the bearing part of the motor shown in FIG. 1.

FIG. 9 shows an example in which ball bearings, which are not non-contact bearings, are used instead of the bearing portion of the motor shown in FIG. 1. In FIG. 9, the rotary shaft 61 is supported by ball bearings 62, 63, and the stationary member 64 is mounted on the rotary shaft 61 by a method such as the shrinkage fitting. On the other hand, the ball bearings 62, 63 are fixed to the motor housing 65, and a pre-load is given to the bearings by a pre-load spring 66 and a spring stopper 67. Here, the circumferential groove 4b is also provided on the top surface 4a of the rotary polygon mirror 4 while the circumferential groove 6b on the bottom surface 6a of the drive magnet 6, similarly as in FIG. 1. Balancing of the rotary body is effected by putting balance weights not shown on these grooves 4b, 6a. The motor housing 65, to which the rotary shaft 61, ball bearings 62, 63, etc. are mounted, is arranged as capable of being incorporated onto the base 8 from above it, and they are fixed to each other by screws or the like. This arrangement also permits balancing of the motor of the inner rotor type using the ball bearings to be carried out in the same manner as in FIG. 1, thereby making it possible to enhance the accuracy of balancing.

Figure 10:
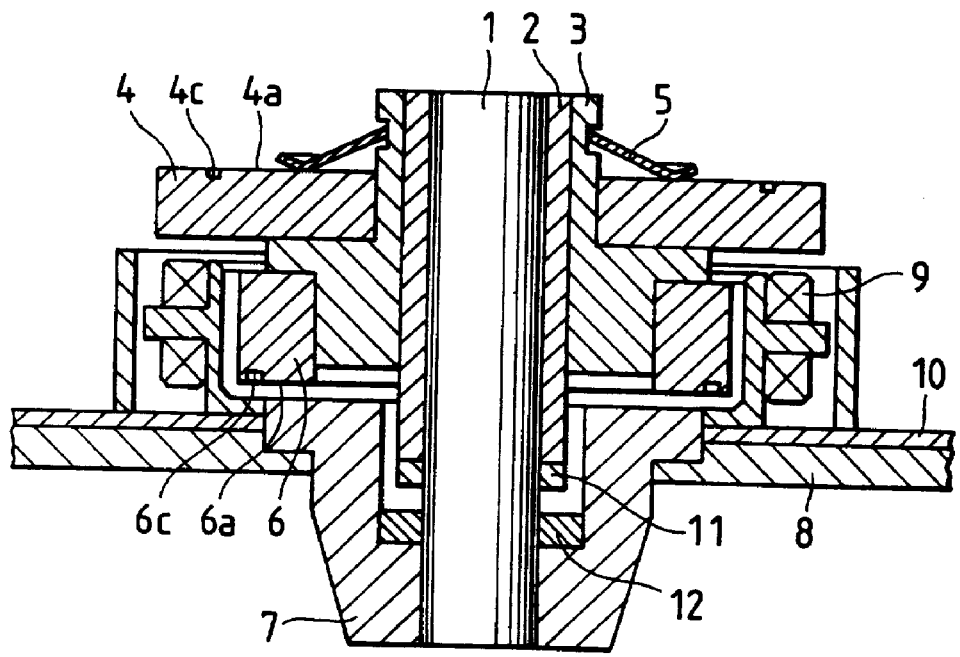
FIG. 10 is a sectional view of a scanner motor of a type which is corrected for balance by scraping off a part thereof instead of adding the balancing weight to the motor shown in FIG. 1.
Figure 11:
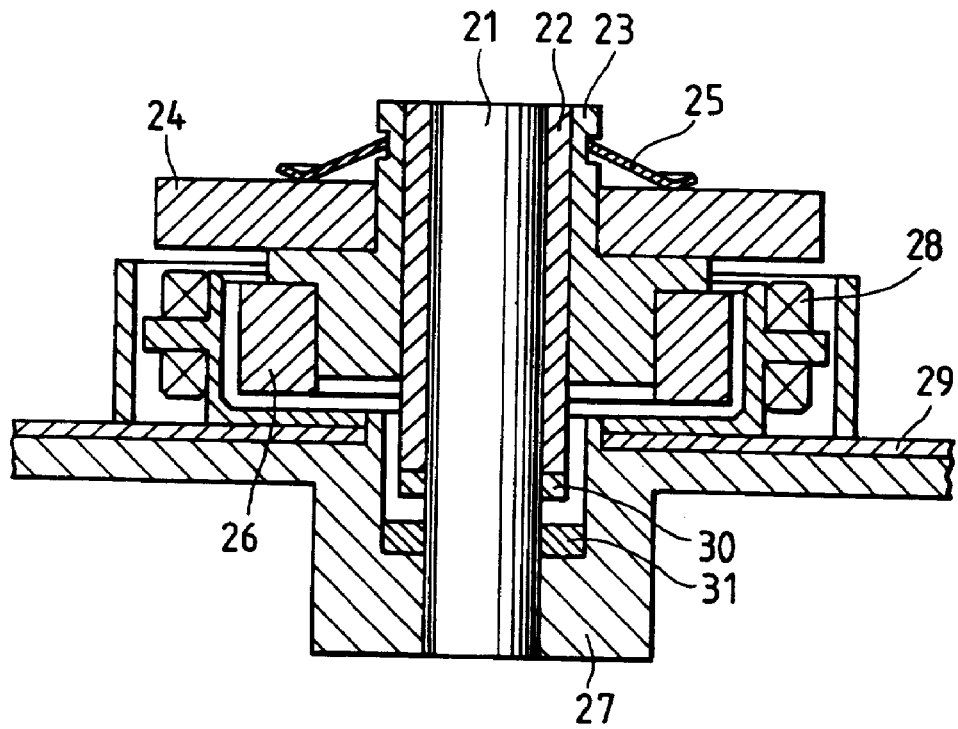
FIG. 11 is a sectional view of the conventional scanner motor of the inner rotor type.
Figure 12A:
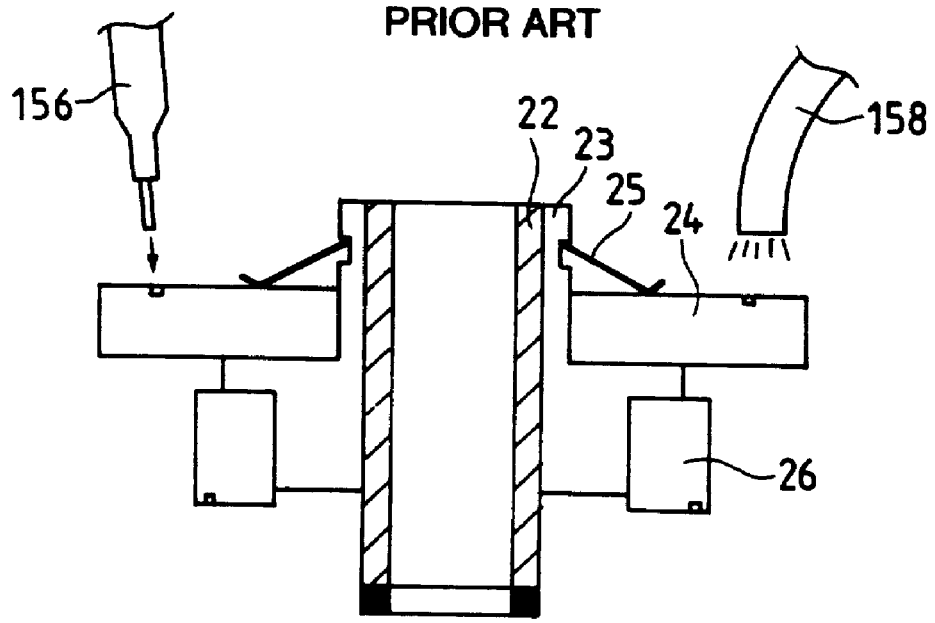
FIG. 12A is a drawing to show a state of balancing on the rotary polygon mirror side of the scanner motor shown in FIG. 11.
Figure 12B:
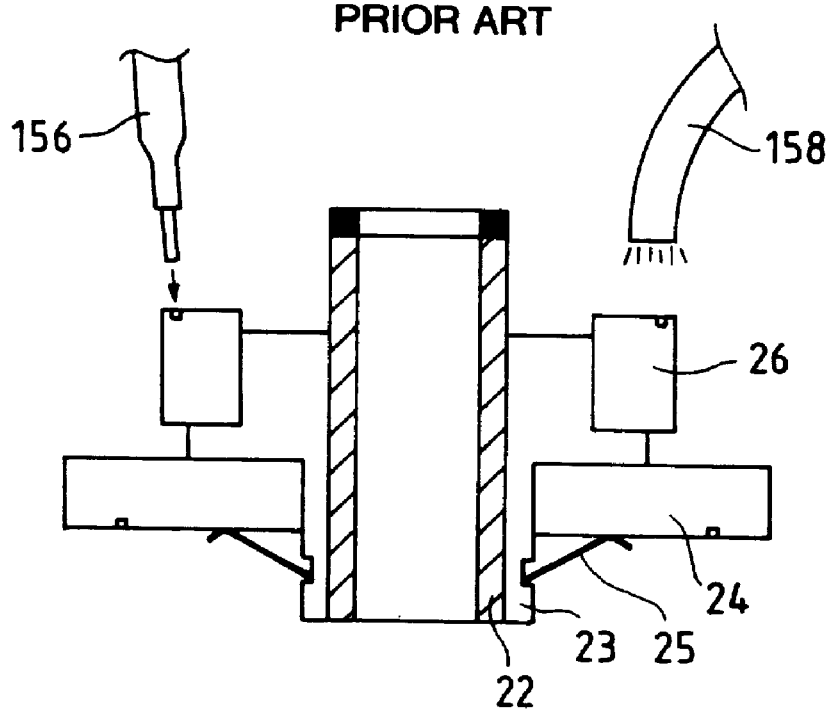
FIG. 12B is a drawing to show a state of balancing on the drive magnet side of the scanner motor shown in FIG. 11.

FIG. 10 is a drawing to show a scanner motor of a type which is corrected for balance by scraping off the balancing weight instead of adding the balancing weight. In FIG. 10, elements made of the same materials and having the same functions as those in FIG. 1 are denoted by the same reference numerals and are omitted to explain herein. In FIG. 10, a material of a high specific gravity is put in the grooves 4c and 6c, and balancing can be effected by scraping off the material by an end mill or the like. The present invention can thus be applied to the cases of minus correction in this manner. Although here is explained the case wherein the material of a high specific gravity is put in the grooves 4c, 6c, correction may be carried out by directly scraping off the rotary polygon mirror 4 and the drive magnet 6 themselves or separate members for correction fixed thereto. The whole or a part of these balancing portions is exposed and is arranged so that a tool such as the end mill can make access thereto.

As explained above, the present invention permits even the scanning optical apparatus using the drive motor of the inner rotor type to be constructed in such a manner that the rotary part is arranged as capable of being separated from the stationary part, only the rotary part is put on the balance corrector upon balancing, and the rotary part is rotated by the stator a rotating unit preliminarily set in the balance corrector to measure and adjust an amount of unbalance, which obviates a need to dismount the rotary body in the case of non-contact bearings, which facilitates the operation, and which lowers the probability of damaging the bearing portion.

In the case of using the ball bearings, balancing can be effected by self drive, which permits balancing with much higher accuracy than that of the balancing using the belt drive.

What is claimed is:

1. A method for correcting the balance of an inner rotor type scanner motor, comprising the steps of:

separating said scanner motor into a rotary part, which includes a motor housing having a bearing for supporting a rotating member to which a driving magnet is fixed, and a stationary part including a stator coil and a magnetic member fixed on a base;

mounting the separated rotary part on a balance corrector, which includes a stator portion having a substantially identical structure to the said stationary part of said scanner motor;

measuring an amount of unbalance of the rotary part of the scanner motor while rotating the rotary part on the balance corrector; and correcting the balance of the rotary part of the scanner motor according to the amount of unbalance of the rotary part in a state mounted on the balance corrector.

2. A balance correcting method for an inner rotor type scanner motor for rotation-driving a rotary polygon mirror for performing deflection scanning, wherein said scanner motor is arranged as separable into two units including a rotary unit part for holding a bearing of a rotary member to which said rotary polygon mirror and a drive magnet are fixed on a motor housing and a stationary unit part in which a stator coil and a magnetic member are disposed on a base, said method comprising the steps of:

separating said scanner motor into the rotary unit part and the stationary unit part;

mounting the rotary unit part thus separated on a balance corrector;

rotation-driving said rotary unit part on the balance corrector, which includes a stator portion having a substantially identical structure to the stationary part of said scanner motor; and measuring an amount of unbalance of the rotary unit part while rotating the rotary unit part on the balance corrector.

3. The balance correcting method for the scanner motor according to claim 2, wherein said motor housing has a first mount portion, said base has a second mount portion, and coupling of said rotary unit part with said stationary unit part is released by disengaging engagement between the second mount portion of said base and the first mount portion of said motor housing.

4. The balance correcting method for the scanner motor according to claim 2, wherein said rotary member is a rotary sleeve and said bearing is a hydrodynamic bearing.

5. The balance correcting method for the scanner motor according to claim 2, wherein said rotary member is a rotary shaft and said bearing is a ball bearing.

6. A balance corrector for an inner rotor type scanner motor, which is arranged as separable into two units consisting of a rotary unit part for holding a bearing of a rotary member to which a rotary polygon mirror and a drive magnet are fixed, on a motor housing, and a stationary unit part in which a stator coil and a magnetic member are disposed on a base, said balance corrector comprising:

a mounting portion which is arranged in such a manner that, after separation of the scanner motor into the rotary unit part and the stationary unit part, the motor housing of the rotary unit part may be received in the mounting portion; and a stator portion having a substantially identical structure to the stationary unit part and disposed in such a location that, when the motor housing of the rotary unit part is received in said mounting portion, said stator portion is disposed opposed to the drive magnet of the rotary unit part on the side of the outer periphery thereof, wherein a clearance is provided between said stator portion and said mounting portion in which a device for correcting the balance is to be located; and said device is manipulated through said clearance to effect balance correction of the rotary unit part in accordance with an amount of unbalance of the rotary unit part rotation-driven by said stator portion.

7. The balance corrector for the scanner motor according to claim 6, wherein said drive magnet of said rotary unit part has a rotation correcting portion and said device is manipulated through said clearance to effect balance correction on the rotation correcting portion of said drive magnet.

8. The balance corrector for the scanner motor according to claim 7, wherein said rotary unit part has another rotation correcting portion in said rotary polygon mirror in addition to the rotation correcting portion of said drive magnet and another device is manipulated to effect balance correction on the another rotation correcting portion of said rotary polygon mirror.

* * * * *

UNITED STATES PATENT AND TRADEMARK OFFICE
CERTIFICATE OF CORRECTION

PATENT NO.    : 6,145,377

DATED         : November 14, 2000

INVENTOR(S)   : MIKIO NAKASUGI ET AL.

It is certified that error appears in the above-identified patent and that said Letters Patent is hereby corrected as shown below:

ON THE COVER PAGE

Under Column [56], References Cited, in Other Publications, "Ptent" should read --Patent--.

COLUMN 6

Line 8, "The" should read --a--;
    Line 14, "The" should read --a-;
    Line 17, "The" should read --a--;
    Line 31, "and" should be deleted;
    Line 46, "The" should read --a--; and
    Line 51, "The" should read --a--.

Signed and Sealed this

Twenty-ninth Day of May, 2001

Attest:

NICHOLAS P. GODICI

Attesting Officer      Acting Director of the United States Patent and Trademark Office